United States Patent [19]
Taylor et al.

[11] Patent Number: 5,547,644
[45] Date of Patent: Aug. 20, 1996

[54] OZONE GENERATION SYSTEM

[75] Inventors: P. A. Taylor, Dallas; Todd O. Futrell, Kennedale; Neil M. Dunn, Jr., Carrollton; Michael P. Jusko; Casey R. DuBois, both of Arlington; Jimmie D. Capehart, Sadler, all of Tex.

[73] Assignee: Electronic Drilling Control, Inc., Irving, Tex.

[21] Appl. No.: 310,288

[22] Filed: Sep. 21, 1994

[51] Int. Cl.$^6$ ................................................. B01J 19/12
[52] U.S. Cl. ............................... 422/186.18; 422/186.19; 422/906
[58] Field of Search ................. 422/186.07, 186.18, 422/186.19, 907, 906; 204/176

[56]  References Cited

U.S. PATENT DOCUMENTS

| | | | |
|---|---|---|---|
| 2,857,323 | 10/1958 | Cromwell | 204/176 |
| 3,719,573 | 3/1973 | Kawahata | 204/176 |
| 3,899,685 | 8/1975 | Francis et al. | 250/536 |
| 3,942,020 | 3/1976 | Ciambrone | 250/539 |
| 4,427,426 | 1/1984 | Johnson et al. | 55/162 |
| 4,495,043 | 1/1985 | Marets | 204/176 |
| 4,897,246 | 1/1990 | Peterson | 422/186.3 |
| 4,908,189 | 3/1990 | Staubach | 422/186.19 |
| 5,034,198 | 7/1991 | Kaiga et al. | 422/186.07 |
| 5,236,673 | 8/1993 | Coakley et al. | 422/186.07 |
| 5,348,709 | 9/1994 | Wheatley | 422/186.18 |

*Primary Examiner*—Charles T. Jordan
*Assistant Examiner*—Daniel Jenkins
*Attorney, Agent, or Firm*—Jenkens & Gilchrist, P.C.

[57]  ABSTRACT

An ozone generator is disclosed. The ozone generator includes a housing forming a tubular-shaped shell. A tubular ceramic electrode is suspended within the tubular-shaped shell of the housing. An end of the electrode protrudes from the tubular-shaped shell of the housing. The electrode, as suspended, forms a annular space of uniform width between the shell and the electrode, which space serves as the discharge gap. A Teflon™ retainer grips the end of the electrode protruding from the tubular-shaped shell of the housing. The retainer connects with the housing to maintain the electrode fixed in position within the tubular-shaped shell.

8 Claims, 5 Drawing Sheets

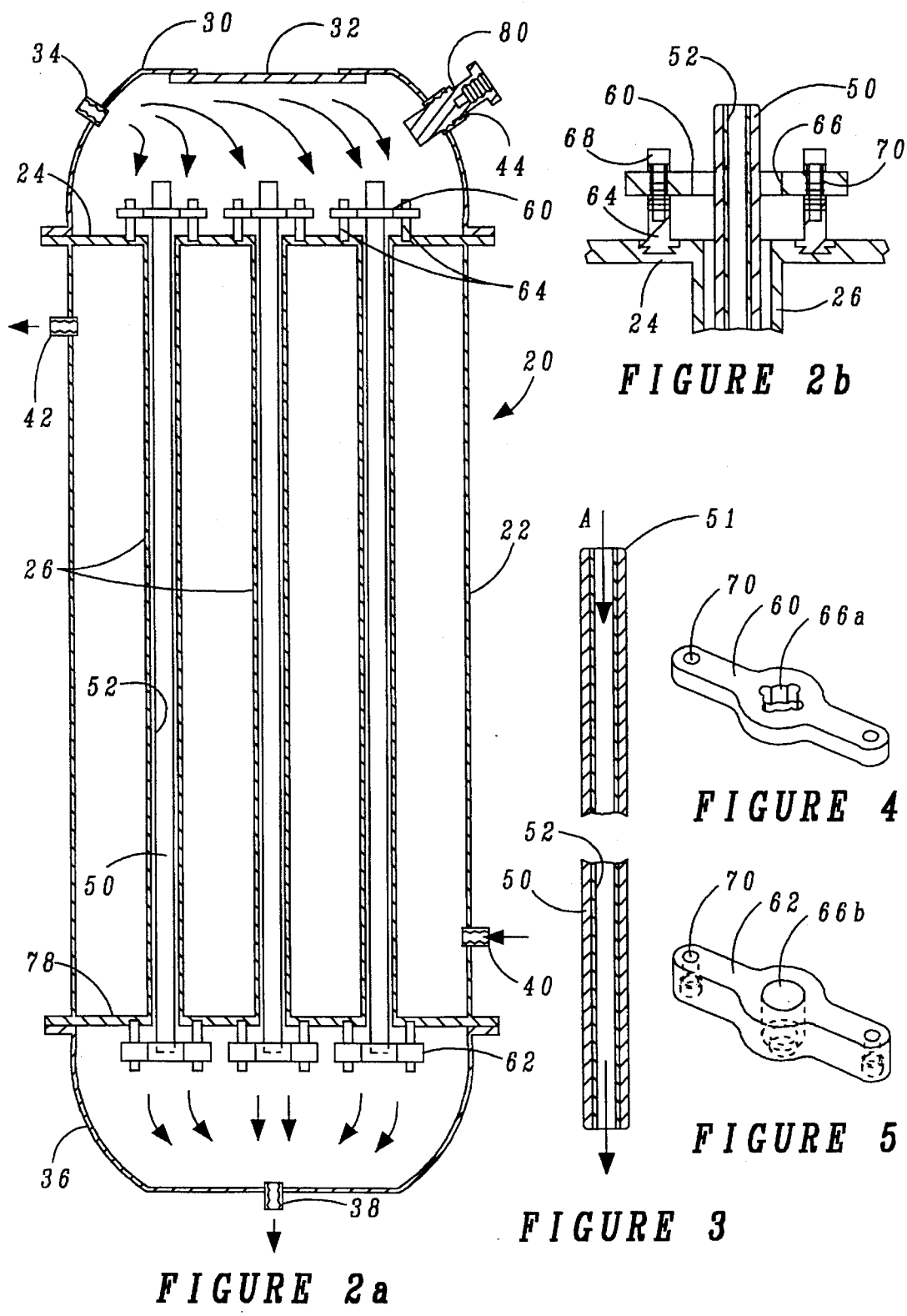

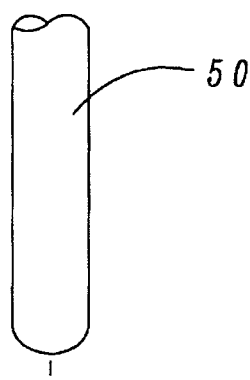
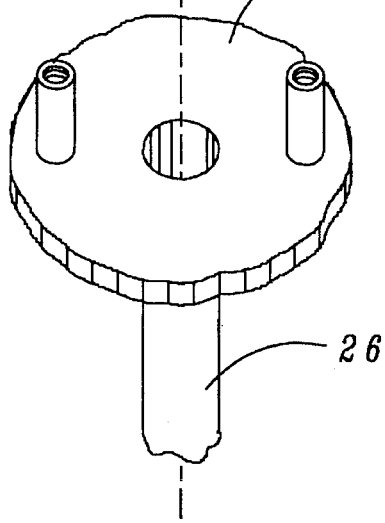
FIGURE 9
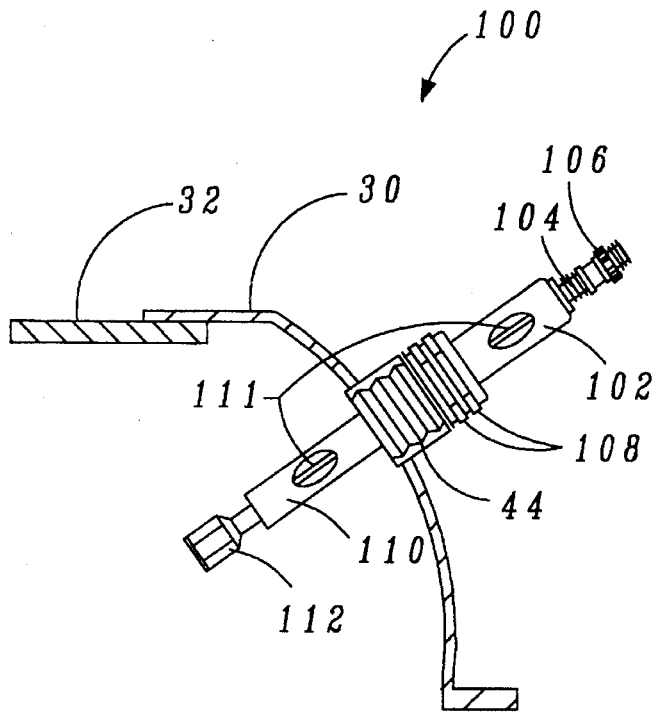
FIGURE 10
(PRIOR ART)
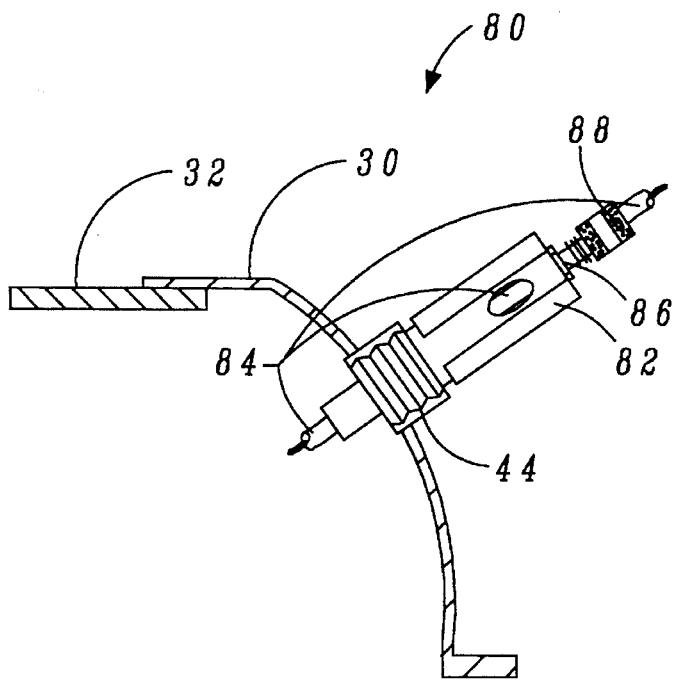
FIGURE 11

OZONE GENERATION SYSTEM

BACKGROUND OF THE INVENTION

1. Field of the Invention

The invention generally relates to systems and methods for ozone generation and, more particularly, relates to an ozone generator having improved electrode design and configuration and improved voltage supply mechanisms, and provides improved ozone yields.

2. Description of the Related Art

Ozone ($O_3$) is a naturally occurring compound in the atmosphere. Ozone may also be reactively generated by manmade systems and methods. To obtain reactively generated ozone, the dual atoms of oxygen ($O_2$) are caused by electrical discharge to dissociate and to re-combine as three atom molecules, forming ozone ($O_3$). The reactive formation of ozone is typically achieved utilizing what is known as a corona cell. A corona is a physical phenomenon characterized by a low-current electrical discharge across a gaseous gap at a voltage gradient exceeding a certain critical value. A corona cell is an apparatus that supplies such a corona. A typical corona cell configuration consists of two metallic electrodes separated by a gas-filled gap and a dielectric material.

In reactive formation of ozone via a corona cell, an oxygen-bearing gas flows through the discharge gap of the corona cell while high voltage is applied to the electrodes. The ozonation reaction is initiated when free, energetic electrons in the corona dissociate oxygen molecules:

$$e^{-1} + O_2 \rightarrow 2O + e^{-1}$$

Following this, ozone is formed by a three-body collision reaction:

$$O + O_2 + M \rightarrow O_3 + M$$

Where M is any other molecule in the gas. At the same time, however, atomic oxygen and electrons also react with ozone to form oxygen:

$$O + O_3 \rightarrow 2O_2$$

$$e^{-1} + O_3 \rightarrow O_2 + O + e^{-1}$$

Because all of these reactions take place when oxygen molecules are dissociated forming ozone, the net ozone that may be produced via a corona cell will depend upon the extent to which reaction variables are suitable to allow the reactions producing ozone to occur without significant destruction of the ozone produced because of the other reactions also occurring. In any case, the reaction variables and, thus, the ozone yield depend on many factors, including, for example, the oxygen content and temperature of the feed gas, contaminants in the feed gas, the ozone concentration achieved, the power density in the corona, the coolant temperature and flow, the effectiveness of the cooling system, and other factors. As may well be understood, these factors influence the design of ozone generation systems and methods, including design of corona cells for those systems and methods.

Ozone, both naturally occurring and that produced through reactive ozonation, is a gas with a penetrating odor. The gas is useful for many purposes. One particular use of ozone is in treatment of water to make it potable. An example of that use is described in U.S. patent application Ser. No. 08/214,644, titled TRANSPORTABLE, SELF-CONTAINED WATER PURIFICATION SYSTEM AND METHOD.

In producing ozone from oxygen, prior commercial ozone generators have used two basic corona cell geometries: concentric tubes and parallel flat plates. In those prior concentric tube type generator cells, the tubes serve as electrodes with a dielectric disposed therebetween in the annular space formed between the tubes. In the prior flat plate type generator cells, the dielectric is suspended between the flat plates maintained in a parallel arrangement. In the case of each type of prior corona cell design, an oxygen-bearing gas flows through the space between the electrodes, called the "discharge gap," while high voltage is applied to the electrodes. Electrically, a corona cell presents a capacitive load to the power supply due to both the gas-filled gap and the dielectric material present. As a direct result of power dissipation in the corona because of the discharge gap and dielectric, ozone is produced in the corona as oxygen and another gas are passed through the gap.

As can be understood, the various factors previously described as affecting net yields of ozone from an ozonation reaction are dependent, at least in part, upon the particular configuration of the corona cell of an ozone generator. One important characteristic of the corona cell configuration that dictates the factors is the physical characteristics of the discharge gap between the electrodes in which oxygen that is being dissociated to form the ozone flows. Another factor is the particular voltage gradient across the electrodes. Other factors include the particular characteristics of the electrodes, the dielectric, and the gases present in the cell.

Typically, trade-offs in design parameters of a corona cell for an ozone generator include distance between electrodes forming the discharge gap and voltages necessary to achieve an appropriate voltage gradient between electrodes. Generally, the wider the discharge gap, the higher the voltage must be and the greater the current necessary to sustain that higher voltage. Higher voltages in ozone generation can be problematic causing significant power of the ozone generator to be dissipated into heat, which heat destroys some or all of the ozone which is formed. Thus, to obtain optimum net yields of ozone from the ozonation reaction, it is advantageous to provide a narrower gap between electrodes, thereby requiring only lower voltages to achieve the necessary potential for the reaction. Of course, with lower voltages, lower currents may be employed and so less power will be dissipated into heat. The net effect, then, of a narrower discharge gap is that more ozone is obtained from the system because by utilizing lower voltages, and thus, lower currents, to achieve the ozonation reaction, less heat dissipation occurs and ozone produced through the ozonation reaction is not destroyed (at least not to the extent of destruction with higher voltages) after formation because of heat of the system.

The prior ozone generator systems and methods have attempted to reduce distance between electrodes forming the discharge gap in several ways. One approach has been to employ a shell and tube type arrangement, wherein the shell and tube form the electrodes and the dielectric in the annular space formed between shell and tube. This approach of the prior art has a number of disadvantages. For example, a disadvantage is that the tube of those arrangements has not been easily suspended in the shell in a manner which forms a uniform annular discharge gap. Another disadvantage has been that the suspension of the tube within the shell has required complex mechanical arrangements which have not made such a shell and tube arrangement easy to service and maintain. These are but a few of the disadvantages of the prior art.

The prior art ozone generator systems and methods have also sought to optimize ozonation by reducing system power that is dissipated as heat. As previously described, heat can destroy ozone and, thus, system power dissipated as heat is not desired. The prior art systems and methods have not effectively reduced system power dissipation for several reasons. Possibly the most significant reason is that the prior art shell and tube arrangements have not provided sufficiently insulated connections between internals of the shell and the power applied externally to the generator. Other disadvantages are also exhibited by the prior art.

Further, choice of materials has been an important disadvantage in the prior art because that has also been a reason for less than optimum ozone yields from those systems and methods. Prior art systems and methods have been limited with respect to materials available for use as electrodes and electrode material. The prior art has also been limited with respect to choice of insulative and connective materials.

The present invention provides significant improvement in the art and technology of ozone generation. As will be hereinafter more fully explained, the present invention overcomes many of the problems of the prior technology ozone generators. In particular, the present invention provides a reduced discharge gap width and, yet, maintains quite uniform discharge gap arrangement. The present invention also allows for ease of access for repair and maintenance of the electrodes and related corona cell mechanisms. Even further, the present invention provides significant improvement in insulation to reduce generator system power dissipated as heat, which reduction limits destruction of ozone formed. Finally, the present invention allows for advantageous selection of materials for achieving improved net ozone yields. As will be understood and appreciated by those skilled in the art, the invention is a significant improvement in the technology and provides the herein described advantages and improvements, and many others.

SUMMARY OF THE INVENTION

One embodiment of the invention is an ozone generator. The ozone generator comprises a housing forming a tubular-shaped shell, a tubular electrode, suspendable within the tubular-shaped shell of the housing, with an end of the electrode protruding from the tubular-shaped shell of the housing, the electrode as suspended forms an annular space of uniform width between the shell and the electrode, and a retainer for gripping the end of the electrode protruding from the tubular-shaped shell of the housing, the retainer connecting with the housing.

In another aspect, the tubular electrode is a ceramic tube having a metal disposed internally, circumferentially within the tubular electrode.

In yet another aspect, the retainer is a Teflon™ non-conductive material having a hole of diameter substantially equivalent to a diameter of the tubular electrode and wherein the tubular electrode is passed through the hole and maintained therein to achieve the gripping.

In even another aspect, the housing includes raised studs and the retainer includes screw holes corresponding to the raised studs, the retainer being connected with the housing via screws through the screw holes, threaded into the raised studs.

In still another aspect, the housing allows circulation of coolant fluid outside of the shell.

In another aspect, the ozone generator further comprises an upper plenum connected with the housing, the upper plenum including a gas inlet, for sealing gas passed through the inlet within the upper plenum and passing the gas through the shell containing the tubular electrode to form ozone.

In yet a further aspect, the ozone generator further comprises a hollow bolt through which passes a conductor of voltage for providing voltage to the electrode, wherein the upper plenum includes a threaded hole that accommodates the hollow bolt, the hollow bolt seals the threaded hole to prevent passage of gas therethrough.

In yet a further aspect, the hollow bolt provides selective passage of the conductor of voltage through the hollow bolt.

Another embodiment of the invention is a method of generating ozone. The method comprises the steps of forming a tubular-shaped shell within a housing, suspending a tubular electrode within the tubular-shaped shell, with an end of the electrode protruding from the tubular-shaped shell, the electrode as suspended forms an annular space of uniform width between the shell and the electrode, and retaining the end of the electrode with the housing.

In another aspect, the method further comprises the steps of flowing oxygen and another gas through the tubular-shaped shell, and applying voltage to the electrode sufficient to dissociate the oxygen to form ozone.

In even another aspect, the step of forming includes the steps of creating a ceramic tube of length sufficient to pass through the shell with a portion that extends beyond the shell and disposing a conductor internally, circumferentially within the ceramic tube.

In yet another aspect, the step of retaining includes the steps of forming a hole of diameter substantially equivalent to a diameter of the tubular electrode in Teflon™ and passing the tubular electrode longitudinally through the hole to maintain the tubular electrode in the hole.

In even a further aspect, the method further comprises the step of connecting the retainer to the housing.

In yet a further aspect, the method further comprises the step of circulating coolant along an outer circumference of the shell.

In still a further aspect, the method further comprises the steps of selectively passing a conductor of voltage into the housing to supply the electrode in a manner that prevents gas escape from the shell.

Yet another embodiment of the invention is an electrode. The electrode comprises a ceramic tube and a conductive foil disposed around the internal circumference of the ceramic tube.

In another aspect, the ceramic tube is a high alumina ceramic.

In even another aspect, the conductive foil is supplied with a voltage.

In yet another aspect, the ceramic tube has outer circumferential chamfers at an end of the ceramic tube.

Another embodiment of the invention is a method of forming an electrode. The method comprises the step of placing a conductive foil within a ceramic tube.

In another aspect, the step of placing includes the steps of rolling the conductive foil to form a roll of outer diameter smaller than an inner diameter of the ceramic tube, passing the roll of the conductive foil into the ceramic tube, and allowing the roll of the conductive foil to unroll to contact an inner circumference of the ceramic tube.

Other embodiments of the invention include the product electrode obtained from the methods.

Still another embodiment of the invention is a retainer for positioning a tubular electrode within a tubular shell. The retainer comprises a Teflon™ non-conductive material piece having a hole substantially conforming to a contour of the tubular electrode, a securement device for gripping the Teflon™ non-conductive material piece, and a fixed part for attaching with the securement device.

Yet another embodiment of the invention is a method of positioning a tubular electrode within a tubular shell. The method comprises the steps of forming a hole in a Teflon™ non-conductive material piece, the hole substantially conforms to a contour of the tubular electrode, gripping the Teflon™ non-conductive material piece via a securement mechanism, and attaching the securement mechanism to a fixed part.

Even another embodiment of the invention is a method of retaining an electrode within a tubular shell. The method comprises the steps of passing the electrode into the tubular shell until a portion of the electrode remains unpassed into the tubular shell and gripping the portion of the electrode to hold the electrode in position.

In another aspect, the step of gripping includes the step of forming a Teflon™ non-conductive material piece with a hole that substantially conforms to a contour of the electrode.

Yet another embodiment of the invention is a device for passing a conductor through a hole in a pressure vessel wall. The device comprises a Teflon™ non-conductive material part that plugs the hole, the Teflon™ non-conductive material part including hollow space allowing the conductor to be located through the hollow space, a compression sleeve connected with the Teflon™ non-conductive material part, the conductor passes through the compression sleeve, and a compression nut for mating with the compression sleeve to cause the compression sleeve to compress around the conductor sealing passage of gases through the hollow space of the Teflon™ non-conductive material part.

In another aspect, the compression sleeve is rubber.

Another embodiment of the invention is a method of passing a conductor through a pressure vessel wall. The method comprises the steps of forming a hole in the pressure vessel wall, placing a Teflon™ non-conductive material piece into the hole, the Teflon™ non-conductive material piece has a hollow space for holding the conductor, connecting a rubber gasket to the Teflon™ non-conductive material piece and compressing the rubber gasket to seal the rubber gasket and the Teflon™ non-conductive material piece around the conductor.

BRIEF DESCRIPTION OF THE DRAWINGS

For a more complete understanding of the present invention and for further objects and advantages thereof, reference may now be had to the following description in conjunction with the accompanying drawings, in which:

FIGS. 2A–2B are longitudinal cross-sectional views through an ozone generation chamber of the present invention, including shell and tube configuration and insulative fixtures thereof;

FIG. 3 is a longitudinal, foreshortened cross-sectional view of a ceramic tube, internally and circumferentially disposed with electrode material, of the present invention;

FIG. 4 is a perspective view of an embodiment of an upper electrode retainer for precisely suspending ceramic tubes within the ozone generation chamber of FIG. 2A;

FIG. 5 is a perspective view of an embodiment of a lower electrode retainer for precisely suspending ceramic tubes within the ozone generation chamber of FIG. 2A;

FIG. 9 is a partial perspective, exploded view of an embodiment of spacers, useable with or without the retainers, for positioning ceramic electrode tubes within a shell of the ozone generation chamber of the present invention;

FIG. 10 is a partial cross-sectional view through an upper plenum of a prior art ozone generation chamber, and a side view of an electrical spark plug type fixture of the prior art ozone generation systems and methods;

FIG. 11 is a partial cross-sectional view through an upper plenum of the ozone generation chamber of the present invention, and a side view of a Teflon™ high voltage pass-through for supplying power in the present invention ozone generation systems and methods;

Like numbering employed throughout the various figures is employed to identify identical elements, unless otherwise herein noted.

DETAILED DESCRIPTION OF THE INVENTION

The present invention is, in one embodiment, an improved system and method for ozone generation. The system and method overcome the problems of the prior technology, and so are significant improvements in the art. In the following description, various embodiments of the present invention are described, including, without limitation, a preferred embodiment of the invention.

Figure 1:
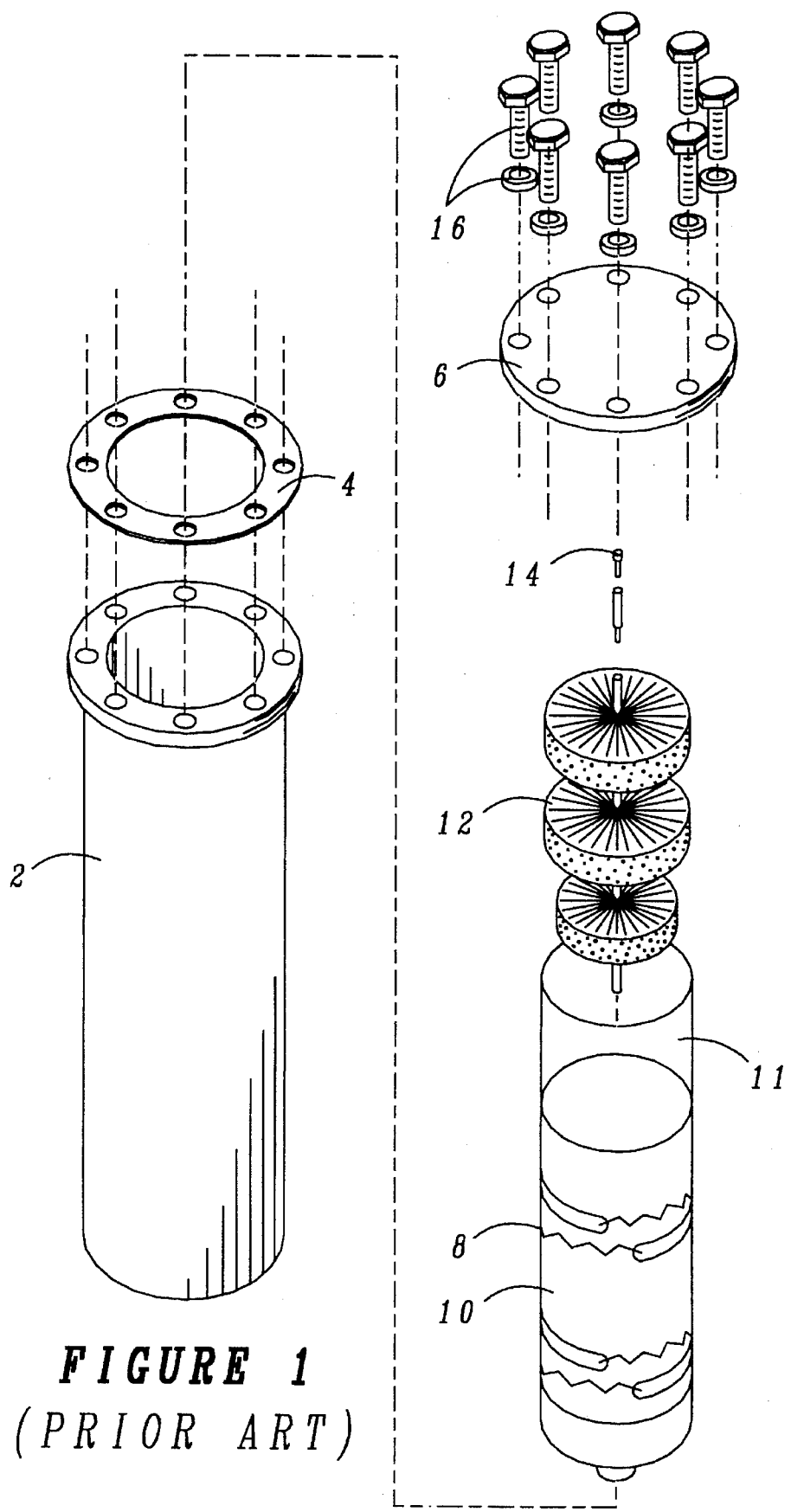
FIG. 1 is a perspective, exploded view of an exemplary prior art shell and tube type corona cell used in the prior technology ozone generation systems and methods.

Referring first to FIG. 1, an exemplary prior art shell and tube type corona cell for an ozone generation system is shown. The prior art shell and tube type corona cell includes an ozone chamber 2. The chamber 2 is composed of metal or another material. Placed within the ozone chamber 2 is an electrode material 10. The electrode material 10 is disposed internally (or in some instances externally) on a tube 11 of Pyrex™ heat-, chemical- and electrical-resistant material or other similar material. The tube 11 is suspended somewhat uniformly within the ozone chamber 2 by spacer bracelets 8 around the electrode material 10 and tube 11. An electrical connection to the electrode material 10, such as a suspension brush 12, serves to supply voltage to the electrode material 10.

Continuing to refer to FIG. 1, in operation, the electrode material 10 and tube 11 are placed within the ozone chamber 2, the spacer bracelets 8 serving to form a uniform annular space between the ozone chamber 2 and electrode material 10. The suspension brush 12 is inserted within the tube 11 to supply the electrode material 10 with voltage. A voltage supply (not shown) is connected with the suspension brush 12, for example, by a connecting nut 14. The ozone chamber 2 is then sealed to prevent internal gas from escaping, via an end cover 6 and a cover gasket 4. The end cover 6 is held in place, for example, by cover bolts and washers 16.

Still referring to FIG. 1, the prior art corona cell can function to generate ozone from oxygen. In operation, oxygen and another gas are fed into the annular space formed between the ozone chamber 2 and the electrode material 10. As the gas is flowed through that annular space, voltage is supplied to the electrode material 10 by means of the suspension brush 12, creating a voltage gradient from the ozone chamber 2 to the electrode material 10. As previously described, the voltage gradient causes oxygen molecules to dissociate yielding ozone. As was also previously discussed, this and other prior art corona cells for ozone generation suffer disadvantages, such as less then optimum ozone yield because of the cell configuration, complexity of the cell and resulting complexity of repair and maintenance, and less than superior materials.

Continuing to refer to FIG. 1, ozone yields are limited in the exemplary prior art corona cell because of distance between the electrode material 10 and the ozone chamber 2, i.e., the discharge gap. In particular, the discharge gap in prior art systems and methods has measured from about 2 mm to about 3 mm in width between electrode material 10 and ozone chamber 2. This has been the case because of the particular suspension mechanisms available for locating the electrode material 10 and chamber 2 in proximity. For instance in the exemplary corona cell, the discharge gap can be no smaller in width than is necessary to accommodate the spacer bracelets 8. In the exemplary corona cell and other prior art cells, spacer bracelets 8, or other similar devices, have been necessary to uniformly dispose the electrode material 10 in close proximity with respect to the ozone chamber 2. Because the discharge gap width achievable in prior art ozone generators has been limited to greater than or equal to about 2-3 mm, a high voltage has been necessary to achieve a suitable voltage gradient for the ozonation reaction. Creation of that high voltage gradient with such large discharge gap widths requires significant system power which is substantially dissipated as heat in the corona cell. That heat destroys ozone, and so ozone yields from the prior art corona cells have been limited.

Further still referring to FIG. 1, the prior art corona cells, such as the exemplary prior art shell and tube corona cell, do not provide for easy access for repair and maintenance of the electrodes and corona cell mechanisms. For example, in the exemplary corona cell, repair of the electrodes and/or related mechanisms requires, for each cell, removal of the end cover 6 and cover gasket 4 held in place by the cover bolts and washers 16. Further, that repair and maintenance requires, for each cell, removal of the suspension brush 12 from within the electrode material 10. Even further, electrode material 10, along with spacer bracelets 8, must, for each cell, be removed from the ozone chamber 2. Once repairs or maintenance is performed, the reverse of the removal process is necessary, for each cell, to place the ozone generator in condition for operation.

Still referring to FIG. 1, the materials of the prior art corona cells, such as the exemplary cell, are disadvantageous for achieving improved ozone yields. This is the case because the prior art corona cells have not been sufficiently provided with insulative and conductive materials, at least in part because of the configuration of the cells. The materials and configuration thereof, because of the high voltage gradient required and lack of sufficient insulative mechanisms, result in significant power dissipated as heat during system operation. The heat, as previously described, destroys ozone, and so ozone yields from the prior art ozone generators are limited.

Referring now to FIGS. 2A and 2B, an embodiment of an ozone generation chamber 20 in accordance with the principals of the present invention may be described. In FIG. 2A, the ozone generation chamber 20 is seen to include a housing. In one embodiment, the housing is a reactor shell 22. The reactor shell 22 includes both an upper portion, e.g., an upper endplate 24, and a lower portion, e.g., a lower endplate 28. Each of the upper endplate 78 and lower endplate 78 include openings leading to a series of tubular shaped shells 26. The shells 26 serve as corona cells for ozone generation. The reactor shell 22 is furnished with a coolant inlet 40 and a coolant outlet 42, providing means for circulating coolant fluid within the reactor shell 22 and, thus, around the corona cells formed of the tubular shaped shells 26.

Continuing to refer to FIG. 2A, within each shell 26 is disposed a ceramic electrode 50. The ceramic electrode 50 may be of a variety of types, however, a high alumina ceramic electrode performs well in ozone generation. The ceramic electrodes 50 are each a ceramic tube extending longitudinally through the shell 26 and having an electrode material 52 fixed internally thereto. The ceramic electrodes 50 are longer than the length of the shells 26 to allow protrusion beyond the upper endplate 24 and lower endplate 28 when the ceramic electrodes 50 are located in place for operation. The ceramic electrodes 50 internally include a circumferentially disposed electrode material 52. This electrode material 52, along with shell 26, serve to in operation provide the necessary voltage gradient for the ozone generation reaction.

Further still referring to FIG. 2A, each of the ceramic electrodes 50 is suspended within a shell 26 of the ozone chamber 2 in a manner which provides a uniform annular space formed between the ceramic electrode 50 and the shell 26. This uniform annular space is the discharge gap for the generator device. In one embodiment, the ceramic electrodes 50 are positioned by upper electrode retainers 60 and lower electrode retainers 62. The upper electrode retainer 60 and lower electrode retainer 62 are maintained in place by retainer studs 64. The particular configuration for this disposal of the electrodes 50 within the shell 26 will hereinafter be more fully explained in greater detail.

Still referring to FIG. 2A, the assembly is sealed for passage of gas through the shells 26 of the ozone generation chamber 20 by end caps, which may, for example, be an upper plenum 30 and a lower plenum 36. The upper plenum 30 provides a gas inlet 34 for the input flow of oxygen, together with another gas, for the ozone generation reaction. The upper plenum 30 also provides a voltage supply connection threaded hole 44 for connection of a voltage supply for the reaction. Within the voltage supply connection threaded hole 44, a Teflon™ non-conductive material high voltage pass-through 80 may serve to seal reaction gasses within the ozone chamber 20 and yet allow voltage delivery from outside the chamber 20 to within the chamber 20. The upper plenum 30 may also be provided with other accessories, for example, a view port 32 which allows an operator to view the internals of the chamber 20. Further still referring to FIG. 2A, the lower plenum 36 operates similarly to the upper plenum 30 to seal reaction gasses within the ozone generation chamber 20. The lower plenum 36 may contain an ozone outlet 38 through which ozone generated in the chamber 20 may exit the chamber 20.

Still referring to FIG. 2A, in operation, coolant fluid is flowed through the reactor shell 22 outside the tubular shaped shells 26. That coolant fluid enters the coolant inlet 40 and exits the coolant outlet 42. As previously described, heat destroys ozone. Therefore, coolant fluid is desirable to reduce heat of the ozone generation chamber 20, which heat would destroy the ozone produced. The reactant products, oxygen and another gas, are fed to the ozone generation chamber 20 via the gas inlet 34. The gasses flow into the upper plenum 30 and disburse through the longitudinal passage through each of the ceramic electrodes 50 and in the annular space formed between each of the ceramic electrodes 50 and its respective shell 26. As the gasses pass through the electrodes 50 and annular spaces, the gasses are contacted with a voltage gradient suitable for causing oxygen dissociation and formation of ozone. The voltage gradient is created by supplying a high voltage across electrode material 52 contained within the ceramic electrodes 50. The high voltage is supplied across the electrode material 52 of each ceramic electrode 50 through the Teflon™ non-conductive material high voltage pass-through 80. This Teflon™ non-conductive material high voltage pass-through 80, as well as other embodiments of similarly functioning mechanisms, provides particular advantages and will be hereinafter further discussed. Ozone created by the ozone generation reaction flows from the electrodes 50 and out of the annular space into the lower plenum 36, and exits the ozone generation chamber 20 through the ozone outlet 38.

Now referring to FIG. 2B, a detail of an embodiment of an upper electrode retainer 60 as employed in the ozone generation chamber 20 of FIG. 2A is described. The upper electrode retainer 60 is formed with a retention hole 66 and retainer screw holes 70. The retainer screw holes 70 match with certain retainer studs 64 which extend from the upper endplate 24 of the reaction shell 22 (See FIG. 2A). The upper electrode retainer 60 is held in place with the retainer studs 64 by retainer screws 68. In this manner, the upper electrode retainer 60 by virtue of the retention holes 66 serves as a guide for a ceramic electrode 50. When an upper electrode retainer 60 is positioned in this manner and a lower electrode retainer 62 (shown in FIG. 2A) is similarly positioned, a ceramic electrode 50 may be suspended within the shell 26 of the reactor shell 22 (see FIG. 2A) in a manner creating a uniform annular space between the ceramic electrode 50 and the shell 26. Because the ceramic electrode 50 is internally affixed with an electrode material 52 and the electrode 50 is suspended in this manner, a uniform discharge gap is formed. This uniform discharge gap can be very narrow because of the particular means for suspending the electrodes 50 via the electrode retainers 60, 62. Discharge gaps of at least as narrow as 1.3 mm to 1.5 mm are achievable with accurate uniformity of the gap and desired effects for ozone generation reaction. (Wider gap width is also possible.)

Now referring to FIGS. 2A and 2B in conjunction, the advantages of the present invention over the prior art may be better understood. As for ease of maintenance and repair, the present invention allows for easy access and removal of electrodes 50. For example, electrodes 50 are removed by first removing the upper plenum 30 of the ozone reaction chamber 20. The upper plenum 30 may be easily removed because it is secured with the reactor shell 22 by screws or other satisfactory securement means. Thus, by removing these screws or other securement means, the upper plenum 30 may be removed entirely from the configuration. Once the upper plenum 30 is so removed, access to each of the ceramic electrodes 50 and related internals is possible. Note that similar access to the electrodes 50 and related mechanisms of the prior art corona cell device (see FIG. 1) is not possible. In the prior art device, each individual corona cell has been capable of only separate access. That separate access to each individual cell has required removal of screws or other securement mechanisms and removal of covers to each cell in order to access and touch the electrode, dielectric and discharge gap areas. Also, the prior art arrangement required that any chamber containing multiple corona cells include passage of at least one wire per corona cell into the chamber and to the corona cell for supplying the voltage necessary for the ozonation reaction. The present invention, as will be later more fully explained herein, allows for a single insulated electrical wire to connect with the outside of the ozone reaction chamber 20 and then multiple wires to connect the individual electrodes 50 internally within the reaction chamber 20. Also, the particular Teflon™ non-conductive material high voltage pass-through 80, hereinafter more fully described, allows for advantageous sealing of gasses within the ozone generation chamber 20 while maintaining superb insulative characteristics, and also allowing removal of the upper plenum 30 without disconnection of voltage supply wires.

Now referring to FIG. 3, a detail of a ceramic electrode 50 of the present invention is shown. Gas flow through the ceramic electrode 50 when in operation is illustrated by arrow A. The ceramic electrode 50 is a tubular ceramic piece. The ceramic may include a varied composition, for example, a high alumina ceramic material. The ceramic electrode 50 is internally, circumferentially layered with an electrode material 52. The electrode material 52 may be disposed internally within and along the internal wall of the ceramic electrode 50 in a variety of manners. One manner is to employ an electrode material 52 in the form of a foil sheet. One type of foil sheet that is suitable is 321 stainless foil. Such a foil sheet may be rolled to have smaller diameter than the internal diameter of the tubular electrode 50. The rolled sheet can then be fed through the tubular electrode 50 and once disposed within the electrode 50 allowed to unroll against the internal circumference of the electrode 50. The ceramic electrode 50 also may have chamfered ends 51. These chamfered ends 51 of the electrode 50 provide for ease of insertion of the electrode into a retention hole 66 of an electrode retainer 60, 62.

Now referring to FIG. 4, a perspective view of an embodiment of an upper electrode retainer 60 of the present invention is illustrated. Though the upper electrode retainer 60 could take a variety of forms, one embodiment is that shown. In the embodiment, the upper electrode retainer 60 is formed of a Teflon™ non-conductive material to provide desired insulative and other properties. Retainer screw holes 70 are formed in either end of the retainer 60, and a retention hole 66a is formed between the retainer screw holes 70. The retention holes 66a could be of a variety of configurations, as well could the shape of the particular retainer 60. One particular configuration for the retention holes 66a, however, is that of a round hole of diameter substantially equivalent to that of the outer diameter of a ceramic electrode 50 (shown in FIG. 3) to be retained by the retainer 60. Further, the retention holes 66a may be formed as additional, smaller round holes offset around the circumference of the hole the size of the electrode 50. Such an arrangement as shown in FIG. 4 allows ease of travel of an electrode 50 through the retention hole 66a.

Next referring to FIG. 5, an embodiment of a lower electrode retainer 62 for use in the present invention is shown. The lower electrode retainer 62 is also formed of Teflon™ non-conductive material or some other suitable material. The thickness of the lower electrode retainer 62 may be greater than that of the upper electrode retainer 60 (see FIG. 4). At the ends of the electrode retainer are located retainer screw holes 70, then centrally between the retainer screw holes 70 is located a retention hole 66b. The retention hole 66b in this lower electrode retainer 62 may be of the diameter of the electrode 50 to allow the electrode 50 to be positioned therein. The retention hole 66b may be of the diameter of the electrode 50 only part of the way through the thickness of the lower electrode retainer 62. This arrangement allows the electrode 50 to be stably positioned both within the retention hole 66b to prevent diametric movement of the electrode 50 and also to prevent longitudinal movement through the lower electrode retainer 62.

Figure 6:
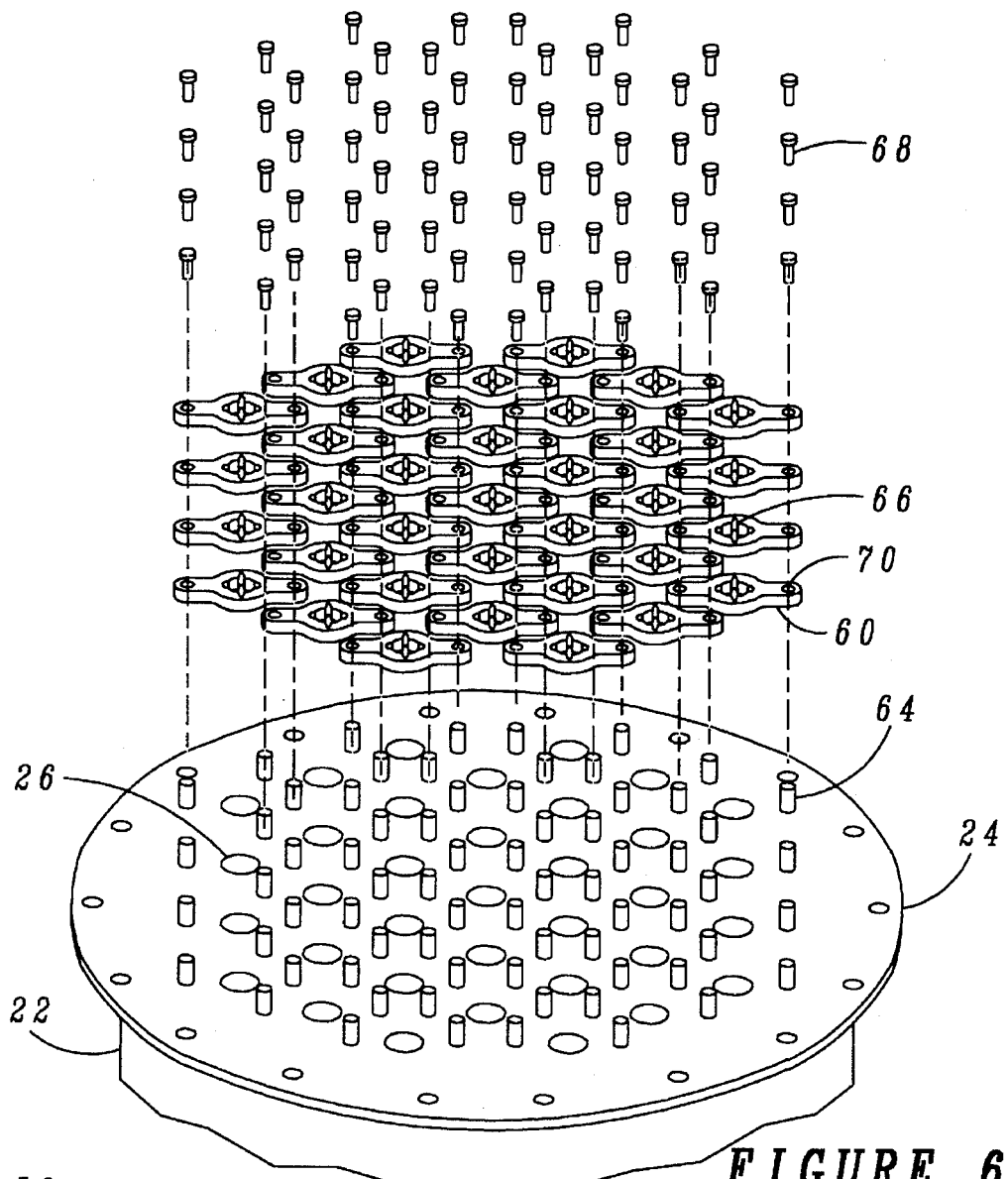
FIG. 6 is a perspective, exploded view of an upper end plate of the ozone generation chamber of FIG. 2A, illustrating the shell holes and upper electrode retainer placement within the upper end plate.

Now referring to FIG. 6, an embodiment of a layout of multiple shell 26 holes in an upper endplate 24 of a reactor shell 22 is shown. The upper endplate 24 contains multiple holes for shells 26. Each hole for a shell 26 is disposed on opposite sides with a retainer stud 64 rising from the upper endplate 24. The retainer studs 64 on each side of a hole of a shell 26 are configured to correspond to retainer screw holes 70 of an upper electrode retainer 60. When an upper electrode retainer 60 is positioned with retainer screw holes 70 corresponding to appropriate retainer studs 64, the upper electrode retainer 60 may be secured in position by retainer screws 68 or other suitable attaching devices. The particular arrangement of shells 26 and, thus, upper electrode retainers 60 shown here are intended only as exemplary. Those skilled in the art will readily appreciate that other configurations conforming to the same principles hereof may provide similarly suitable or even better thermal characteristics and ozone producing reactivity in any particular operation. Though not specifically shown in the drawings, lower electrode retainers 62 may be similarly arranged and configured with the lower endplate 28 (see FIG. 1).

Figure 7:
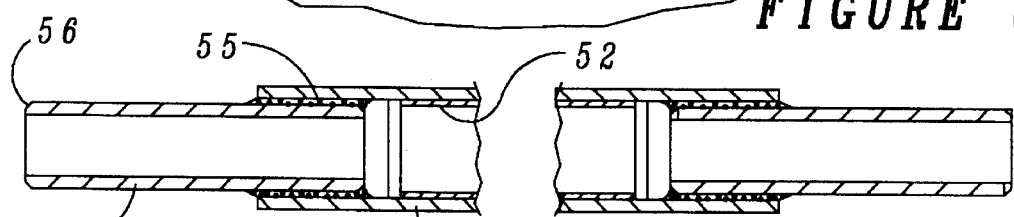
FIG. 7 is a longitudinal, cross-sectional view of another embodiment of a ceramic tube, with internally and circumferentially disposed electrode material, of the present invention, which ceramic tube has ceramic extensions at both ends.

Next referring to FIG. 7, an alternative embodiment of a ceramic electrode 50 suitable for the present invention is shown. In this cross-section of a ceramic electrode 50, the ceramic electrode 50 is seen to at its ends include ceramic extensions 54. These ceramic extensions 54 are inserted into the end of the ceramic electrodes 50 and secured as so inserted by a suitable epoxy 55 or other securement substance. Prior to inserting the ceramic extensions 54 into ends of the ceramic electrodes 50, the electrode material 52, if a steel foil, is inserted into the ceramic electrode 50 and disposed along the inner circumference thereof. The disposition of the electrode material 52 within the ceramic electrode 50 may be accomplished by the rolling method as previously described or in another suitable manner. In this embodiment, the ceramic extensions 54 have an outer diameter that is less than the inner diameter of the ceramic electrode 50. This particular outer diameter of the ceramic extensions 54 provides beneficial characteristics, as hereinafter discussed, when the ceramic electrode 50 is maintained within an ozone generation chamber 20 (not shown) by electrode retainers 60, 62, or other configurations of those or other types of retainers. Note that the ends of the ceramic extensions are chamfered for the reasons previously described with respect to the electrode 50.

Figure 8:
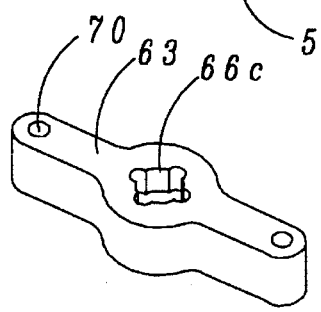
FIG. 8 is a perspective view of another embodiment of a retainer which may be employed as both an upper and a lower retainer with the embodiment of the ceramic tube shown in FIG. 7.

Referring now to FIG. 8, another electrode retainer embodiment, an upper/lower electrode retainer 63, is illustrated. This upper/lower retainer 63 operates with the electrode 50 and ceramic extensions 54 of FIG. 7. This upper/ lower retainer 63, like the retainers previously described, includes retainer screw holes 70 and a retention hole 66c. The retention hole 66c in this upper/lower retainer 63, however, consists of a large hole of diameter substantially equivalent to that of the outer diameter of the ceramic extensions 54. Small holes disposed around the circumference of the larger hole serve the purpose previously described with respect to the other retainers. This particular upper/lower retainer 63 allows only the ceramic extension 54 to protrude through the retention hole 66c. In the case where ceramic extensions 54 are disposed at ends of the ceramic electrode 50, the retention hole 66c of the upper/ lower retainer 63 when used at the lower end of a chamber 20 (not shown) prohibits the electrode 50 from protruding through the retention hole 66c, therefore, serving the same purpose of positioning as was provided by the lower electrode retainer 62 of FIG. 5. Further, the upper/lower retainer 63 may serve to position the upper portion of the electrode 50 because that upper portion also includes a ceramic extension which can protrude through the retention hole 66c. The upper/lower retainer 63, when serving to position both ends of the electrode 50, positions the electrode 50 within the shell 26 (not shown) in an advantageous manner providing the benefits and improvements previously described.

Now referring to FIG. 9, another embodiment of an electrode suspension mechanism is illustrated. In this embodiment, the electrode 50 is passed through several spacers 74. The spacers 74 may be of any suitable non-conductive material, such as Teflon™ non-conductive material. The spacers 74 when positioned at intervals along the electrodes 50 serve to space the electrode 50 within a shell 26 when the electrode 50 is inserted into the shell 26 of an endplate 24.

Now referring to FIG. 10, an embodiment of a prior art spark plug electrical fixture in place for an operation with an upper plenum 30 of an ozone generation chamber 20 may be described. This spark plug fixture 100 is comprised of a ceramic part 102. The fixture 100 includes mediately around the ceramic part 102, a metal fitting which includes a series of screw threads which allow for the spark plug fixture to be positioned in a hole in the upper plenum 30, so that the upper plenum 30 is secured between retention nuts 108, with part of the ceramic part 102 outside the chamber 20 and part of the ceramic part inside the chamber 20. The spark plug fixture 100 retention nuts 108 serve, then, to secure the spark plug fixture 100 with the upper plenum 30. Each end of ceramic part 102 of the spark plug fixture 100 includes a conductive electrical connection. At the ceramic part 102 portion external of the chamber 20, the electrical connection is an upper threaded piece 104 and a nut 106. An electrical voltage supply wire may be connected in a traditional manner at that threaded piece 104 and nut 106. At the ceramic part 102 portion inside the chamber 20, a suitable electrical connection mechanism serves as an attachment point for electrical conductors that supply voltage to electrodes maintained within the ozone generation chamber 20 (not shown). An electrical connecting wire 111 (as shown in phantom) travels through the ceramic part 102 so that external voltage applied to the fixture 100 is passed internally.

Still referring to FIG. 10, this prior art spark plug fixture 100 results in several operational disadvantages. For example, because the spark plug fixture 100 requires connection with the external voltage supply outside the chamber 20 and connection with the electrodes within the chamber 20, removal of the upper plenum 30 typically requires disconnection of the internal connections with the electrodes in order to access the chamber 20 interior, including electrodes therein. Typically, there are multiple internal wires which provide the connection of the electrodes to the spark plug fixture. Further examples of disadvantages of the prior art spark plug fixture 100 include the limited thermal insulative characteristics of that type fixture 100. As has been previously discussed, ozone yields have been limited in the prior art because heat of the ozone generation systems and methods has destroyed at least some of the ozone produced. The prior art spark plug fixture 100 does not provide for sufficient thermal insulative characteristics. Because high voltage for ozone generation is conveyed through the fixture 100, the fixture 100 is subjected to significant heat from power dissipation. This heat, due to the configuration and materials of the prior art fixture 100, is transferred to the chamber 20, thereby increasing heat of the unit and resulting in ozone destruction.

Now referring to FIG. 11, a Teflon™ non-conductive material high voltage pass-through 80 which may replace the prior art spark plug fixture 100 of FIG. 10 is illustrated. This Teflon™ non-conductive material high voltage pass-through 80 joins with the upper plenum 30 via the voltage supply connection threadings 44. The body of the pass-through 80 is in the form of a Teflon™ non-conductive material bolt 82, which bolt 82 is a Teflon™ part having several sides, for example, eight, and a hole for passage of an insulated wire 44 (shown in phantom) therethrough. At the upper end of the Teflon™ non-conductive material bolt 82 is located a threaded end 86 which may be formed of metal or other suitable materials. At this upper end of the bolt 82 is also included a compression sleeve 86 (not shown in FIG. 11 but shown in FIG. 12). The compression sleeve 86 may be compressed by a compression nut 88 tightened on the threaded end 86. The compression sleeve 86 may be formed of rubber or other suitable resilient materials. The compression sleeve 86 when tightened upon an insulated wire 84 passing therethrough and through the Teflon™ non-conductive material bolt 82 serves to prevent gas passage through the bolt 82. The insulated wire 84 protruding through the compression nut 88, the compression sleeve 86, the Teflon™ non-conductive material bolt 82, and the upper plenum 30 can provide the necessary voltage to the electrodes 50 contained within the upper plenum 30 and ozone generation chamber 20 (not shown in full). The insulated wire 84 may be attached with each of a multitude of electrodes 50 (not shown) of an ozone generation chamber 20 in a variety of manners. One particularly desirable manner is to interconnect each of the electrodes 50 in a configuration and to supply a common electrical supply point by connecting the insulated wire 84 to the point. Those skilled in the art will appreciate that other suitable configurations of those inner connections are possible.

Still referring to FIG. 11, because the insulated wire 84 supplying voltage to the chamber 20 may be sealingly secured with the Teflon™ non-conductive material bolt 82 in operation but unsecured and passable within the bolt 82 when the compression nut 88 is unscrewed, the upper plenum 30 may be removed, for example, during repairs and maintenance, without the necessity of disconnecting multiple conductive wires connecting the insulated wire 84 and the electrodes 50. Because the insulated wire 84 can be so selectively passable within the Teflon™ non-conductive material bolt 82, any multiple wires and connections between electrodes 50 within the chamber 20 and between the insulated wire 84 and those electrodes 50 need not be disconnected in order to remove the upper plenum 30 to access the inside of the chamber 20. Also, because only the Teflon™ non-conductive material portions of the Teflon™ non-conductive material bolt 82 touch with the high voltage supply connection threadings 44 of the upper plenum 30, thermal conductivity from the insulated wire 84 within the bolt 82 to the chamber 20 is reduced. This reduced thermal conductivity helps to reduce dissipation of power into heat and resulting destruction of ozone that is produced in the ozone generation chamber 20.

Figure 12:
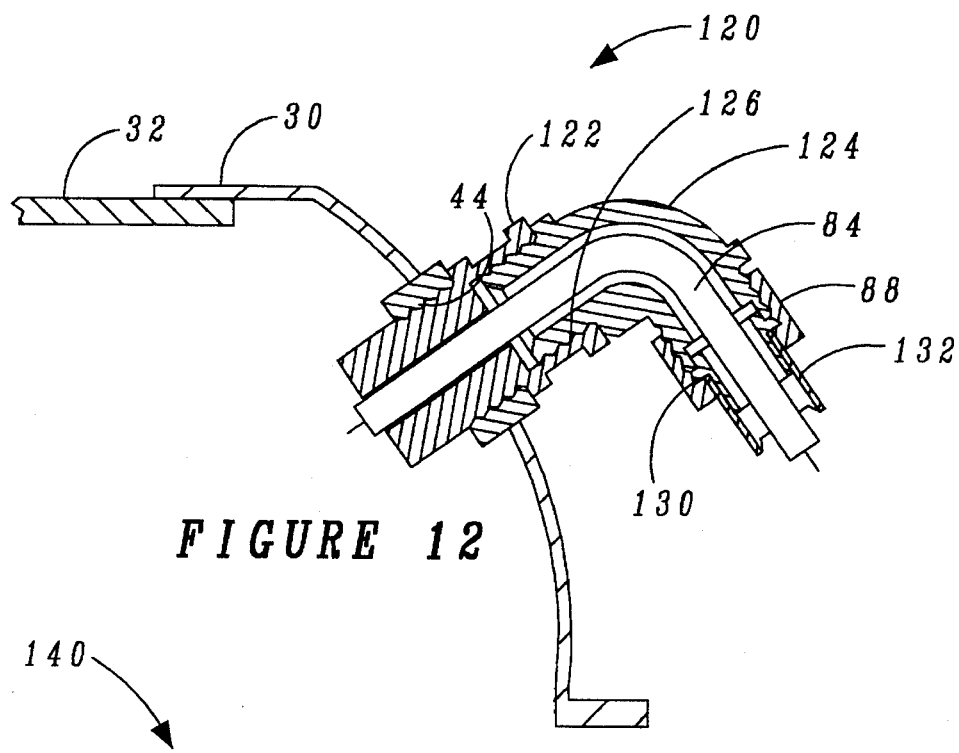
FIG. 12 is a partial cross-sectional view through an upper plenum of the ozone generation chamber of the present invention, and a cross-sectional view of an alterative embodiment of a high voltage pass-through for supplying power in the present invention ozone generation systems and methods.

Next referring to FIG. 12, an alternative embodiment of a Teflon™ non-conductive material high voltage pass-through mechanism 120 is shown. This alternative embodiment Teflon™ non-conductive material mechanism 120 can include a plenum connector 122 formed of Teflon™ non-conductive material for screw fit with threadings 44 of a hole of the upper plenum 30, to achieve results similar to that obtained with the Teflon™ non-conductive material bolt 82 of FIG. 11. This Teflon™ non-conductive material mechanism 120 differs from the bolt 82 of FIG. 11, however, in that the metal compression nut 88 which compresses the rubber compression sleeve 130 operates with a bend piece 124, which may be, for example, formed of a metal. The bend piece 124 allows the insulated wire 84 which passes through the Teflon™ non-conductive material mechanism 120 to bend once the wire 84 passes out of the upper plenum 30. As those skilled in the art will appreciate, a host of other configurations for passing the insulated wire 84 from outside to inside the chamber 20 are possible in accordance with the principles and teachings of the present invention.

Figure 13:
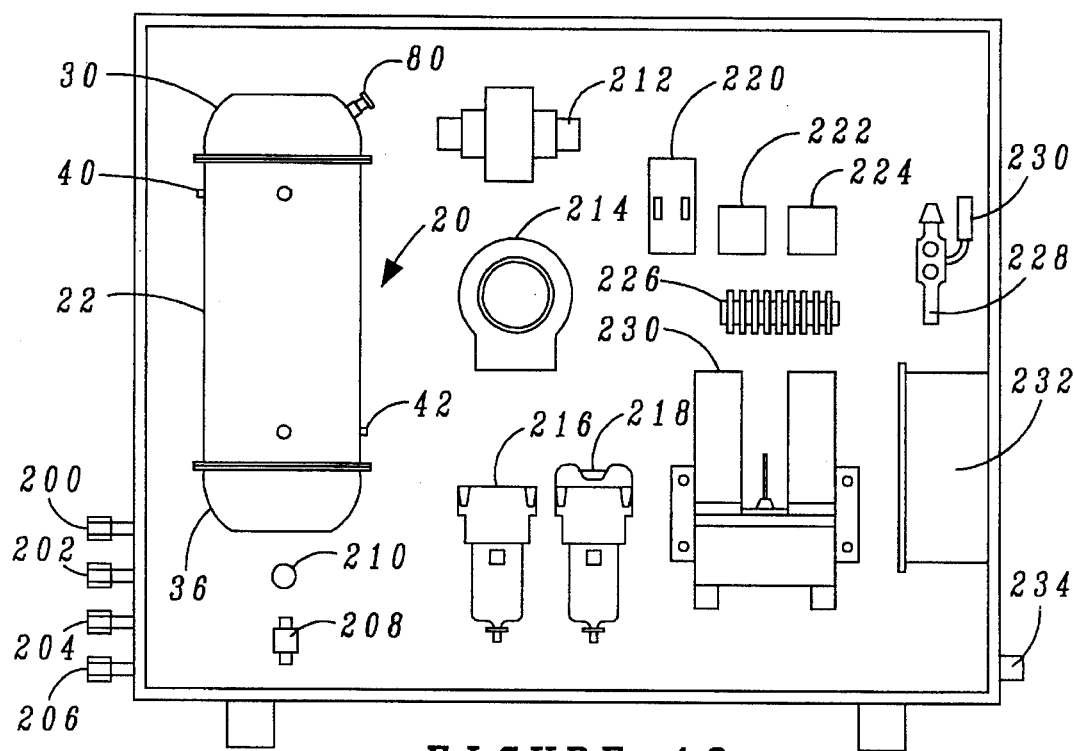
FIG. 13 is a side view illustration of an exemplary ozone generation system employing the ozone generation chamber of the present invention.

Referring now to FIG. 13, an embodiment of the ozone generation chamber 20 of the present invention is shown in operation with other devices to form an embodiment of an ozone generation system 140. The system 140 includes the ozone generation chamber 20 having a coolant inlet 40 and a coolant outlet 42, an upper plenum 30 and a lower plenum 36, and high voltage pass-through Teflon™ non-conductive material device 80. Other aspects of the ozone generation chamber 20 which have been previously described herein are not shown in the drawing but are, or may be, incorporated as well. Other elements of the system 140 include a coolant inlet 200 and a coolant outlet 202, each connected with the respective inlet 40 and outlet 42 of the chamber 20, and a compressed air inlet 204 and an ozone outlet 206, each connected with the respective gas inlet 34 and ozone outlet 38 of the chamber 20. The system 140 includes other peripheral elements, for example, a check valve 208, a needle valve 210, a transformer 212, a variable transformer 214, a particulate filter 216, an oil coalescing filter 218, a ground fault interrupt 220, a relay 222, an on delay timer 224, a terminal strip 226, a regulator/afterfilter 228, a flow switch 230, an air dryer 230, an axial fan 232, and an EMT connector 234, all operationally interconnected as appropriate to provide the desired ozone production capability and capacity. Though these elements of an exemplary system 140 have been listed herein, the elements are not exclusive and certain elements may not be needed or desired or certain additional elements may be needed or desired in a particular application. The listing is not intended to be limiting in this regard.

As is clearly seen, the present invention provides significant improvements and advantages in the technology. The present invention is believed to be especially effective when manufactured and employed as described herein, however, those skilled in the art will readily recognize that numerous variations and substitutions may be made in the system and method and its use, steps, and manufacture to achieve substantially the same results achieved by the embodiments and in particular the preferred embodiment expressed and described herein. Each of those variations is intended to be included in the description herein and forms a part of the present invention. The foregoing detailed description is, thus, to be clearly understood as being given by way of illustration and example only, the spirit and scope of the present invention being limited solely by the appended claims.

What is claimed is:

1. An ozone generator, comprising:

a housing forming a tubular-shaped shell;

a tubular electrode, removably suspended within said tubular-shaped shell of said housing, with an end of said electrode protruding from said tubular-shaped shell of said housing, said electrode as suspended forms an annular space of uniform width between said shell and said electrode;

said electrode having an electrode material affixed thereto; and a retainer for gripping said end of said electrode protruding from said tubular-shaped shell of said housing, said retainer connecting with said housing.

2. The ozone generator of claim 1, wherein said tubular electrode is a ceramic tube and said electrode material is affixed internally, circumferentially within said tubular electrode.

3. The ozone generator of claim 1, wherein said retainer is composed of a Teflon™ non-conductive material having a hole of diameter substantially equivalent to a diameter of said tubular electrode and wherein said tubular electrode is passed through said hole and maintained therein to achieve said gripping.

4. The ozone generator of claim 1, wherein said housing includes raised studs and said retainer includes screw holes corresponding to said raised studs, said retainer being connected with said housing via screws through said screw holes, threaded into said raised studs.

5. The ozone generator of claim 1, wherein said housing allows circulation of coolant fluid outside of said shell.

6. The ozone generator of claim 1, further comprising:

an upper plenum connected with said housing, said upper plenum including a gas inlet, for sealing gas passed through said inlet within said upper plenum and passing said gas through said shell containing said tubular electrode to form ozone.

7. The ozone generator of claim 6, further comprising:

a hollow bolt through which passes a conductor of voltage for providing voltage to said electrode;

wherein said upper plenum includes a threaded hole that accommodates said hollow bolt, said hollow bolt seals said threaded hole to prevent passage of gas therethrough.

8. The ozone generator of claim 7, wherein said hollow bolt provides selective passage of said conductor of voltage through said hollow bolt.

* * * * *

UNITED STATES PATENT AND TRADEMARK OFFICE
CERTIFICATE OF CORRECTION

PATENT NO. : 5,547,644
DATED : Aug. 20, 1996
INVENTOR(S) : Taylor, P.A. et al.

It is certified that error appears in the above-indentified patent and that said Letters Patent is hereby corrected as shown below:

Column 1, line 47   Replace the second occurrence of "$e^{-1}$"
With --e-1--

Column 13, line 35   After "Teflon™"
Insert --non-conductive material--

Signed and Sealed this

Seventeenth Day of December, 1996

Attest:

BRUCE LEHMAN

*Attesting Officer*   *Commissioner of Patents and Trademarks*